July 26, 1927.
W. W. TEW
1,637,133
SAFETY DEVICE FOR VEHICLES
Filed June 7, 1926
2 Sheets-Sheet 1
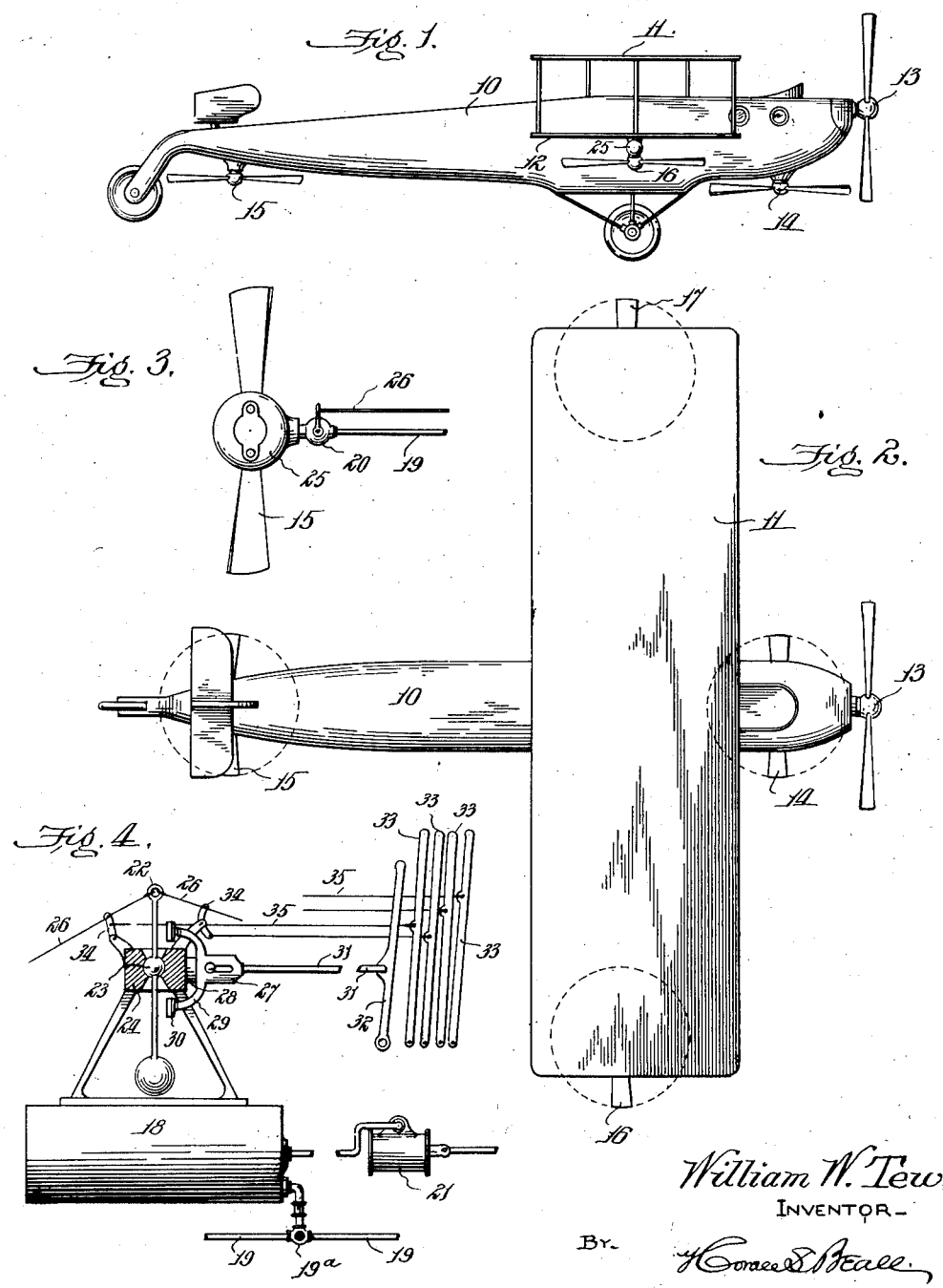
William W. Tew.
INVENTOR
BY
ATTORNEY July 26, 1927.  
W. W. TEW  
SAFETY DEVICE FOR VEHICLES  
Filed June 7, 1926  
1,637,133  
2 Sheets-Sheet 2

William W. Tew.
INVENTOR

BY Horace S. Beale
ATTORNEY

Patented July 26, 1927.

1,637,133

UNITED STATES PATENT OFFICE.

WILLIAM W. TEW, OF BRUNDIDGE, ALABAMA.

SAFETY DEVICE FOR VEHICLES.

Application filed June 7, 1926. Serial No. 114,242.

The primary object of my invention is to provide a vehicle or ship with means operating automatically to prevent it from tilting to a dangerous degree in any direction so as to insure a proper operating balance; that is to say should the vehicle or ship to which the safety devices are applied turn or tilt sidewise or endwise beyond the angle of safe operation said safety devices will instantly act to return the vehicle or ship to a horizontal position or within the control of the operator, as for instance in application to an aeroplane the safety devices will provide for either maintaining the aeroplane evenly balanced on a level course it may be desired to pursue or right the same to bring it under control of the pilot should it assume a dangerous inclination or tilt beyond a normal operation, and in application to a marine vessel the safety devices will operate automatically to prevent the vessel or ship from careening to a dangerous degree or sinking in the water at bow or stern in the event of an accident thereby maintaining the ship on an even keel.

A further object of my invention is to apply the safety devices in slightly modified form for the safe operation of a land vehicle, and in this instance to prevent the vehicle from turning over sidewise by an automatic application of the safety devices should it assume a tilting position.

With these principal objects in view my invention contemplates providing the vessel—aeroplane or marine vessel—with lifting propellers at the opposite sides and ends thereof each having a motor for driving them independently one of the other, in combination with mechanism for automatically and manually controlling the operation of the lifting propellers to provide for emergencies requiring either an automatic or a manual operation; all as hereinafter fully described and specifically set forth in the appended claim.

In the accompanying drawings forming a part hereof:

Figure 1 is a side elevation illustrating the application of my invention to an aeroplane.

Fig. 2 is a plan view of the aeroplane.

Fig. 3 is an enlarged detail view of one of the lifting propellers with its driving motor and valve supplying the fluid pressure thereto.

Fig. 4 is a detail view of the automatic control device.

Figure 5:
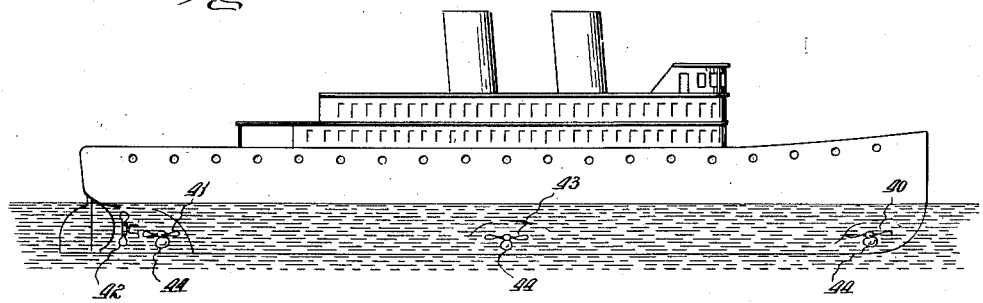
Fig. 5 is a side view illustrating the application of my invention to a marine vessel for stabilizing it.
Figure 6:
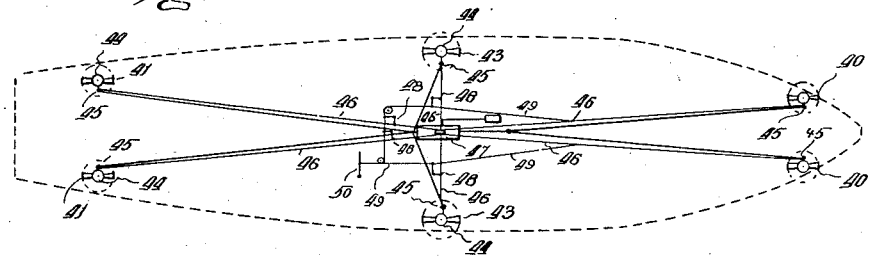
Fig. 6 is a diagrammatic plan view of the marine vessel or ship illustrating the connections between the air tank and motors of the lifting propellers and connections between the automatic control device and valves of the motors.
Figure 7:
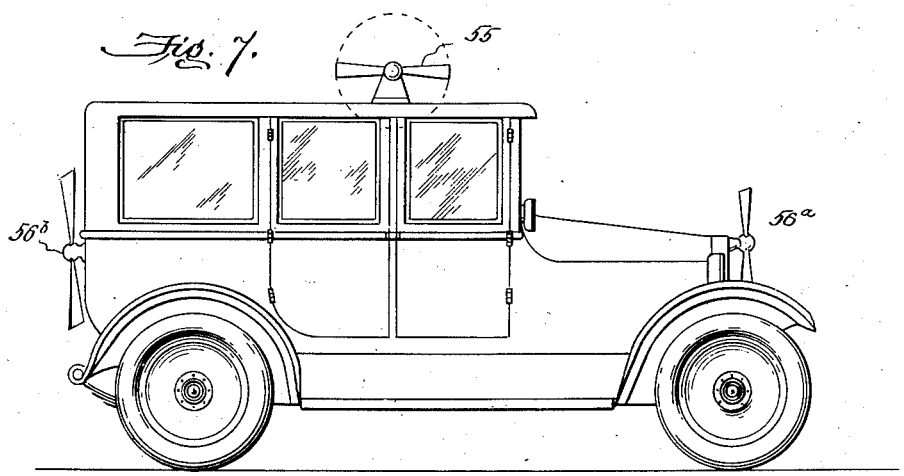
Fig. 7 is a side elevation illustrating the application of the invention to an automobile.
Figure 8:
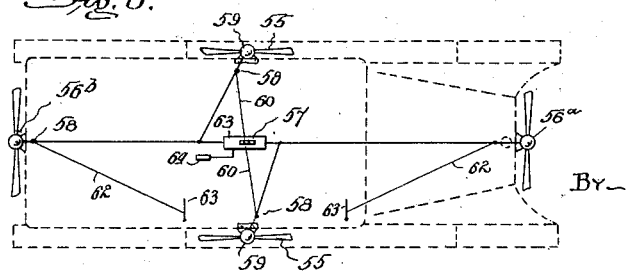
Fig. 8 is a plan view of the safety devices, the automobile being shown in dotted lines.

Referring to Sheet 1 of the drawings my improved safety devices are shown applied to a conventional type of aeroplane or biplane having a fuselage 10, upper and lower wings 11, 12 12, and a vertically disposed driving propeller 13 at the forward end of the fuselage. In this application of my invention I provide the aeroplane with horizontally disposed lifting propellers at the four corners thereof—one 14 at the forward end of the fuselage, preferably under the same, another 15 under the rear end of the fuselage, and one under the outer end of each lower wing and designated by the reference numerals 16 and 17—said lifting propellers in each instance being of a sufficient size to provide the required lifting force, or they may be in pairs of smaller propellers if desired, and are independently driven by a suitable motor which in the present instance is under automatic and manual control by the mechanism hereinafter described whereby any one of them may be operated or driven to lift the aeroplane at its ends or sides in case of an emergency or all driven to maintain the aeroplane in a horizontal position. I prefer to drive the lifting propellers by means of air-motors, 25, using any well known or approved motor of this type, and supply the fluid pressure thereto by means of an air-tank 18 with connecting supply pipes 19, from a 4-way coupling 19ª, each communicating with a spring-actuated plug valve 20 at the motor connected to the control devices which open and close said valves. The air-pressure in tank 18 is supplied by means of an ordinary type of air-compressor 21 geared to the engines (not shown) for operating the driving propeller 13, but it will be understood that the motors for driving the lifting propellers, may be operated by any other fluid-pressure or they may be electric motors.

The mechanism for automatically operating the motor-valves 20 consists of a weighted pendulum 22 supported by a ball and socket joint 23 in the upper end of a frame 24 preferably mounted upon the air-tank 18 at the center thereof, the upper end of the pendulum being connected to pull-wires 26 extending to the different motor-valves 20; it being understood that the pull-wires 26 extend from the pendulum in direct lines longitudinally and laterally with respect to the aeroplane and connect with the motor valves of the lifting propellers to co-operate with this arrangement, that is to say the pull-wire extending forwardly from the pendulum connects with the motor-valve of the lifting propeller 14 at the forward end of the fuselage, the pull-wire extending rearwardly connected to the motor-valve of the lifting propeller 15, and so on. By this arrangement should the aeroplane assume a dangerous tilt downward at the forward end the weighted pendulum by force of gravity would pull on the wire connected to the motor-valve of lifting propeller 14 and said propeller would be driven to lift the forward end of the aeroplane; the rear ends and sides being lifted in like manner when tilted to a dangerous degree by a like operation of the pendulum, pull-wires and motor-valves; but in order that the aeroplane may be permitted to have a limited or safe inclination at all times for descending, rising, or making a turn to right or left there is a slight slack in each of the pull-wires 26 determining the maximum tilt, endwise and sidewise, before the motor-valves will be operated; and for the purpose of locking the automatic control device against operation so that the pilot of the aeroplane can direct the same at any inclination desired, the oscillating pendulum is held in rigid postion by means of a yoke member 27 slidably mounted on a side extension 28 of the supporting frame 24 and having arms 29 above and below the socket member with curved end pieces or shoes 30 to engage the pendulum above and below its fulcrum, said slidable holding device being manipulated by a rod 31 and lever 32, the latter being located within easy reach of the pilot. It will be understood that this device for holding the automatic control against operation is used when the pilot desires to operate the aeroplane at an inclination beyond the limit of inclination provided for by said automatic control device, as for instance to rise or descend rapidly or make a quick turn, but during normal operation of the aeroplane the pendulum would be released for a safe operation of the aeroplane under unexpected dangerous conditions such as an accident to any part of the aeroplane affecting its balance, or sudden wind pressure having the same result. In order that the pilot may manually control the operation of any one or all of the lifting propellers at any time, and more especially when the pendulum is held rigid by the yoke each pull-wire 26 is connected to an operating lever 33, within easy reach of the pilot, the connection being by means of a lever-arm 34 connected directly to the pull-wire and to which the operating lever is connected by wire 35.

By the construction and operation of the safety devices applied to an aeroplane, as hereinbefore described, it will be obvious that when the automatic control device is released the aeroplane can be driven by the pilot in a safe manner or at a safe inclination for ascent, descent, &c., but in the event the aeroplane assumes an inclination beyond the maximum permitted by the automatic control devices the lifting propeller at the lower side of the inclined aeroplane will be immediately operated to lift or right the vehicle or aeroplane, and should the pilot desire to descend abruptly, rise or turn quickly it will be necessary only to operate the lever 32; furthermore, if the pilot desires to be assisted in pursuing a horizontal or level course with his driving motor 13 at reduced speed he may open all the motor-valves 20 by manipulation of the levers 33, and this may be done whether or not the automatic control device is held out of operation by the yoke. In this manner the safety devices provide for bringing the aeroplane to a proper balance under conditions by which it would otherwise be thrown to a dangerous inclination, and at the same time the safety devices may be locked by the pilot to permit him to control the operation of the aeroplane at his own will.

By reference to Sheet 2 of the drawings it will be seen that the safety devices in accordance with my invention when applied to a marine vessel, as a sea-going ship, will provide for maintaining the ship on an even keel or substantially balanced against assuming a dangerous inclination or turning over, and from sinking at bow or stern in case of an accident causing the vessel to fill at any part thereof; in this instance the construction and arrangement of the safety devices being similar to that used in connection with an aeroplane, that is to say there is a lifting propeller 40 at each side of the bow at a location on a plane below the water level, lifting propellers 41 at opposite sides of the stern also below the water level and in front of the driving propellers 42, and a lifting propeller 43 at each side of the vessel amidship and substantially on a plane with the other lifting propellers. In this instance, also, the lifting propellers are preferably driven by air-motors 44, each having a supply-valve 45 of the spring-actuated plunger type as illustrated on Sheet 1 and connected by pull-wire 46 to a weighted pendulum 47 suitably located in a part of the ship, said pendulum being of the same construction as pendulum 22 and operating in the same manner; but in this instance there would be no need of the brake device or yoke for holding the pendulum against operation and therefore this device is not used, although the devices for independently controlling the operation of the driving motors for the lifting propellers would be used, and consequently there is a bell-crank lever 48 connected to each wire and to an operating lever 49 by wire 50, said operating levers to be manipulated to balance the ship or put all the lifting propellers in operation when this is desired to be done manually. In this application of my automatically controlled safety devices for vehicles the ship will be maintained substantially on a level keel, the slack in the connecting wires acting, as in the other case, or aeroplane, to permit the ship to incline endwise and sidewise to a limited extent or to a normal degree on account of rough seas, but in the event of an inclination to a dangerous extent likely to result in the ship turning over or sinking too deeply at bow or stern from any cause the lifting propellers would be brought into action to overcome such inclination or sinking, and of course in case of an accident to the hull of the ship by which it is filling with water one or more or all of the lifting propellers could be put into service by manipulation of the hand-levers 49 thus opening the motor-valves 45 independently of the automatic control devices.

As a further application of my improved automatically controlled safety devices for vehicles and in addition to the application thereof to aeroplanes and marine vessels I have illustrated on Sheet 2 of the drawings how the mechanism may be applied to a land vehicle, as for instance an automobile for the special purpose of preventing the vehicle or automobile from turning over, with vertically disposed motor driven propellers at the front and rear end of the automobile for moving it under emergency conditions as for instance should it become mired and the propelling ground wheels not have the required traction. For the purposes mentioned a vertically disposed pushing propeller 55 is located at each side of the automobile and like propellers 56ª 56ᵇ located at the front and rear end thereof— the side propellers serving to right the automobile in case it tilts beyond a certain extent to either side, and the propellers at front and rear end being operated to either push the automobile forward by the rear propeller 56ᵇ or backward by the front propeller 56ª. In this instance of course vertically disposed propellers are used instead of horizontal propellers as applied to aeroplanes and sea-going ships, and the side propellers only are connected to the pendulum 57; that is to say the valves 58 of the air-motors 59 driving the side propellers 55 would be connected by pull-wires 60 to the weighted pendulum for automatic operation while the motor-valves 58 of the propellers 56ª and 56ᵇ respectively would be operated by hand levers 61 directly connected to said valves by wire 62. As herein shown the several propellers 55, 56ª, 56ᵇ, are each driven by an air-motor, as in the other applications of my invention, receiving the fluid pressure for driving them from a tank 63 into which air is forced by an ordinary form of air-compressor 64 connected up to the driving-shaft, or a driven shaft, of the automobile, and in this instance, as well as in the application of the safety devices to an aeroplane and to a marine vessel or sea-going ship the air-tank will be supplied with any approved type of appliance for stopping the air-compressor when the air-pressure in the tank reaches a predetermined maximum.

By using air-motors for driving the propellers used in carrying out my invention providing safety devices for vehicles the righting of the vehicle is not dependent on the operation of the power employed for driving the vehicle, and it will be understood this makes the safety devices more effective in case of an emergency wherein the driving motors or engines of the vehicle are out of operation from any cause. The size of the air-tanks and pounds of air-pressure maintained therein for operation of the safety propellers will of course depend upon the desired duration of operation of said propellers and lifting or pushing power required.

From the foregoing description, in connection with the accompanying drawings, it will be obvious that my invention provides safety devices which when installed in a vehicle will operate automatically for righting the vehicle in any emergency that is likely to tilt it to a dangerous degree, with provision for controlling the operation of the safety devices by manual operation as well and for putting the automatic control out of operation or locked—in application of the safety devices to an aeroplane—so that the pilot may incline the aeroplane beyond the maximum degree at which the automatic control is put in operation. In every instance the propellers forming part of the safety devices operate instantly to provide the required lifting or pushing power so as to return the vehicle to a proper operating balance as quickly as possible, and of course as the air-pressure in the air-tank which supplies the air-motors with fluid-pressure is depleted by the operation of any one or all of the motors it is replenished by the air-compressor if the driving engines are not put out of commission by accident or otherwise; consequently I propose to have the air-tanks of such size or capacity as to have a sufficient reserve of air-pressure to keep the vehicle balanced for quite a period of time irrespective of the operation of the air-compressors.

I claim:

Safety devices for vehicles operating automatically when the vehicle assumes an inclination beyond a predetermined angle, comprising a set of motor-driven propellers and valves for supplying fluid pressure to the motors, the propellers being mounted on the vehicle and arranged thereon to bring the vehicle to a balanced position on operation of said propellers, a weighted pendulum fulcrumed intermediate its ends in a supporting frame, wires connecting the upper end of the weighted pendulum to the aforesaid valves for operating the latter, a sliding yoke-frame having shoes engaging the pendulum above and below the fulcrum, and auxiliary wire connections to levers for operating the valves independent of the pendulum.

WILLIAM W. TEW.